United States Patent
Olsson

(10) Patent No.: US 8,577,360 B2
(45) Date of Patent: Nov. 5, 2013

(54) UE-BASED MDT MEASURING AND REPORTING IN A CELLULAR RADIO ACCESS NETWORK

(75) Inventor: Andreas Olsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 12/938,930

(22) Filed: Nov. 3, 2010

(65) Prior Publication Data

US 2011/0250880 A1    Oct. 13, 2011

Related U.S. Application Data

(60) Provisional application No. 61/323,154, filed on Apr. 12, 2010.

(51) Int. Cl.
| | |
|---|---|
| H04W 24/00 | (2009.01) |
| H04W 36/00 | (2009.01) |
| H04W 4/00 | (2009.01) |
| H04M 3/42 | (2006.01) |

(52) U.S. Cl.
USPC ........ 455/423; 455/424; 455/425; 455/414.1; 455/456.1; 455/436; 370/331

(58) Field of Classification Search
USPC ................ 455/414.1, 423–425, 456.1–456.6, 455/436–437, 439; 370/331
See application file for complete search history.

(56) References Cited

U.S. PATENT DOCUMENTS

| | | | |
|---|---|---|---|
| 2005/0020284 A1* | 1/2005 | Benco et al. ............... | 455/456.6 |
| 2009/0137265 A1* | 5/2009 | Flore et al. .................... | 455/525 |
| 2009/0257353 A1* | 10/2009 | Song et al. .................... | 370/241 |
| 2010/0190488 A1* | 7/2010 | Jung et al. ..................... | 455/424 |
| 2010/0254348 A1* | 10/2010 | Prakash et al. ................ | 370/331 |
| 2011/0195668 A1* | 8/2011 | Lee et al. .................... | 455/67.11 |
| 2011/0195707 A1* | 8/2011 | Faerber et al. ................ | 455/423 |

OTHER PUBLICATIONS

3GPP TR 36.805 V1.1.0 (Jun. 2009), "3rd Generation Partnership Project;Technical Specification Group Radio Access Network; Study on Minimization of drive-tests in Next Generation Networks; (Release 9)".*
3GPP TSG RAN WG2 #71bis, Xian, China, Oct. 11-15, 2010, pp. 1-3, R2-105356.
3GPP TSG-RAN WG2 Meeting #7bis, Xian, China, Oct. 11-15, 2010, R2-105312.
3GPP TSG-WG2 Meeting #68bis, Valencia, Spain, Jan. 18-22, 2010, R2-101856.

(Continued)

*Primary Examiner* — Jean Gelin
*Assistant Examiner* — Dung Hong
(74) *Attorney, Agent, or Firm* — Nixon & Vanderhye P.C.

(57) ABSTRACT

In one embodiment, if a UE is performing minimizing drive test (MDT) measurements and a radio link failure (RLF) occurs, the UE may add MDT measurement information to an RLF message to the network. In effect, the UE "piggy-backs" MDT information in the RLF report, and in so doing, provides greater flexibility to UEs reporting MDT information and more robust reporting. In another embodiment, the UE detects that no allowed reporting channel to report MDT measurement information exists, stores the MDT information, and after detecting that allowed reporting channel exists, initiates establishment of a radio link with the radio communications network during which the UE informs the network using an availability indicator that the UE has stored unreported MDT measurement information to be reported to the radio communications network.

19 Claims, 6 Drawing Sheets

(56) References Cited

OTHER PUBLICATIONS

3GPP TS 37.cde V0.3.0 (Feb. 2010), Release 10.

3GPP TSG RAN WG2 #69bis, Beijing, China, Apr. 12-16, 2010, R2-101983.

3GPP TSG RAN WG2 #69bis, Beijing, China, Apr. 12-16, 2010, R2-101980.

International Search Report and Written Opinion, Sep. 2, 2011, International Application No. PCT/IB2011/051509.

Nokia Siemens Networks: "UE-originated RLF Reports for Coverage Hole Detection", 3GPP Draft, R3-091925, Aug. 20, 2009, XP050353284.

EMAI Discussion Rapporteur (Nokia Siemens Networks): "Report on Email Discussion [69#30] Trying to Progress Main MDT Open Issues", 3GPP Draft; R2-102082, Apr. 8, 2010, XP050422724.

Deutsche Telekom: MDT Based Enhanced RLF Reporting (Location Information), 3GPP Draft; R2-101983, Mar. 30, 2010, XP050422286.

Nokia Siemens Networks et al: UE-Originated RLF Report for SON, 3GPP Draft; R2-100248 UE-Originated RLF Report for SON, Jan. 12, 2010, XP050420990.

International Preliminary Report on Patentability and Written Opinion dated Oct. 16, 2012 in corresponding PCT international application No. PCT/IB2011/051509.

* cited by examiner

UE-BASED MDT MEASURING AND REPORTING IN A CELLULAR RADIO ACCESS NETWORK

PRIORITY APPLICATION

This application claims priority from U.S. provisional patent application Ser. No. 61/323,154, filed on Apr. 12, 2010, the contents of which are incorporated herein by reference.

TECHNICAL FIELD

The technical field relates to radio communications, and more particularly, to UE-based minimizing drive time (MDT) measuring and reporting in a cellular radio access network.

BACKGROUND

FIG. 1 shows a radio or wireless communications system 1 where wireless terminals 2 (also known as mobile stations and/or user equipment units (UEs)) communicate via a radio access network (RAN) to one or more core networks (shown as a cloud 3). In a cellular communications system, the radio access network (RAN) covers a geographical area which is divided into cell areas, with each cell area being served by a base station, e.g., a radio base station (RBS), which in some networks may also be called a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology where the radio base station nodes are connected directly to a core network rather than to radio network controller (RNC) nodes. In general, in LTE the functions of a radio network controller is (RNC) node are distributed between the radio base stations nodes (eNodeB's in LTE). As such, the radio access network (RAN) of an LTE system has an essentially "flat" architecture comprising radio base station nodes without reporting to radio network controller (RNC) nodes.

In radio access networks like UTRAN and E-UTRAN, it may be desirable to minimize human-based "drive testing" that operators need to perform to troubleshoot and optimize their networks. One alternative for minimizing drive test (MDT) is for UEs to perform measurements and report them to the radio network which may then be forwarded if desired or needed. Example UE reporting methods for these measurements include Logged Reporting and Immediate Reporting. For LTE, a UE can either be in a radio resource control (RRC)-Connected mode (the UE is involved in an active communication) or an RRC-Idle mode (the UE is not involved in an active communication but is "camped" on a cell). In certain LTE networks, Immediate Reporting may be used in RRC-Connected mode and Logged Reporting may be used in RRC-Idle mode. For immediate reporting, the MDT measurements by UEs in RRC-Connected mode are reported to the network (e.g., eNB/RNC) at the time of reporting. For logged reporting, the MDT measurements by UEs in RRC-Idle mode are stored in a measurement log and reported to the network at later points in time when configured conditions are satisfied. Measurement logs may include multiple events and measurements taken over time.

Although immediate reporting is used for connected mode, there are situations that cannot be handled by immediate reporting including when the UE cannot communicate with the RAN, e.g., the UE's radio link fails. In this situation, the UE typically discards the MDT measurements. But from an operator's perspective, it would still be desirable to receive the MDT measurements at a later time if possible because that MDT measurement information may still be valuable for managing the network.

SUMMARY

If a UE is performing minimizing drive test (MDT) measurements and a radio link failure (RLF) occurs, the UE may add MDT measurement information to an RLF message to the network. In effect, the UE "piggy-backs" MDT information in the RLF report, and in so doing, provides greater flexibility to UEs reporting MDT information and more robust reporting.

One aspect of the technology described in this application relates to a method for a user equipment (UE) to report measurement information to a radio communications network. The UE performs minimizing drive test (MDT) measurements for report to the radio communications network. A failure is detected to report MDT measurement information to the radio communications network, and the UE stores unreported MDT measurement information. After a radio link between the UE and the radio communications network fails, the UE initiates reestablishment of a radio link with the radio communications network and informs the radio communications network of stored MDT measurement information. The UE transmits a radio link failure (RLF) message that also includes at least some of the stored MDT measurement information to the radio communications network. The RLF message includes RLF information different from the stored MDT measurement information.

In a non-limiting example, the radio communications network is an LTE-based network. In that case, the initiating reestablishment of a radio link step includes transmitting to the radio communications network a radio resource control (RRC) connection reestablishment request message, and transmitting an indication in an RRC connection reestablishment complete message that the RLF message is available.

In one example embodiment, the MDT measurement information is MDT information measured when the UE was in an immediate MDT reporting mode. In another example embodiment, the MDT information is measured when the UE was in a logged MDT reporting mode.

Another aspect of the technology described in this application relates to a method for a network node in a radio communications network which services user equipments (UEs). The UEs make minimizing drive test (MDT) measurement reports and either report MDT measurement information immediately to the network node or logged them for subsequent reporting to the network node. After a failure in a radio is link established with one of the UEs, a radio link failure (RLF) message is received from the UE that also includes unreported MDT measurement information which is then processed.

In a non-limiting example, the radio communications network is an LTE-based network. In that case, after receiving a radio resource control (RRC) connection reestablishment request message from the UE, an indication is received in an RRC connection reestablishment complete message from the UE that the RLF message is available. The UE is signaled to transmit the RLF message and at least the unreported MDT measurement information.

Another aspect of the technology described in this application relates to apparatus for a user equipment (UE) to report measurement information to a radio communications network. Radio circuitry is provided for establishing a radio link with the radio communications network. Electronic circuitry, coupled to a memory and to the radio circuitry, performs minimizing drive test (MDT) measurements for report to the radio communications network, detects a failure to report MDT information, stores unreported MDT measurement information in the memory, and initiates reestablishment of a radio link with the radio communications network that informs the radio communication network of stored MDT measurement information. The radio circuitry transmits a radio link failure (RLF) report that includes at least some of the stored MDT measurement information to the radio communications network.

Another aspect of the technology described in this application relates to an apparatus for a network node in a radio communications network. Radio circuitry is provided for establishing a radio link with a user equipment (UE). Processing circuitry coupled to the radio circuitry processes one or more minimizing drive test (MDT) measurement reports received from the UE. After a failure in a radio link with the UE, the processing circuitry processes a radio link failure (RLF) message received from the UE that also includes unreported MDT measurement information. In one non-limiting LTE-compliant example, the apparatus is an eNB.

In another non-limiting, example embodiment, the UE performs MDT measurements for report to the radio communications network as before and detects that no allowed reporting channel to report MDT measurement information exist. The UE stores unreported MDT measurement information. Thereafter, the UE detects an allowed reporting channel to report MDT measurement information and initiates establishment of a radio link with the radio communications network during which it informs the radio communications network using an availability indicator that the UE has stored unreported MDT measurement information to be reported to the radio communications network. The availability indicator may for example be a part of a radio connection setup related message. The stored MDT measurement information may be of the Immediate Report type or of the Logged Report type.

DETAILED DESCRIPTION

Figure 1:
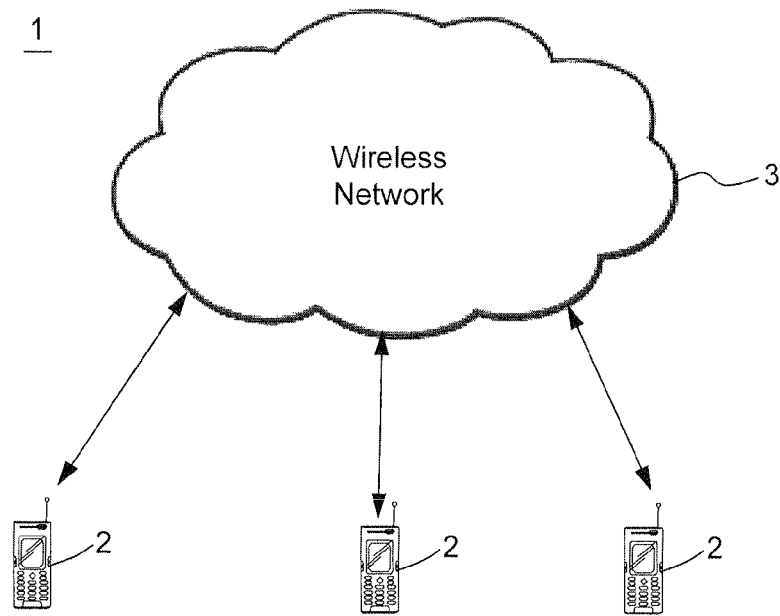
FIG. 1 illustrates a non-limiting example of a wireless communications system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 2:
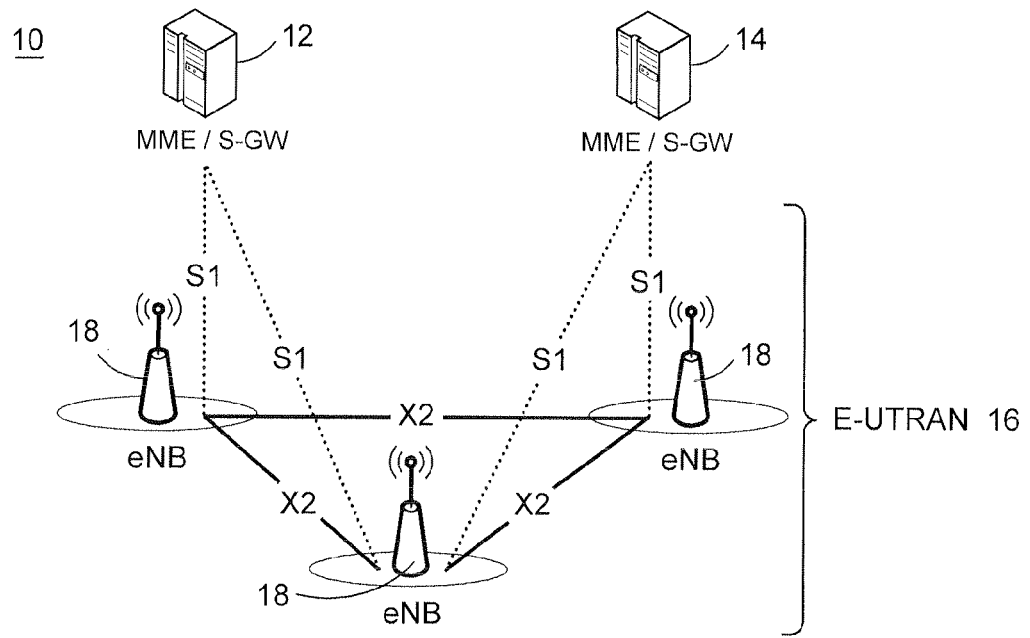
FIG. 2 illustrates a non-limiting example of a wireless LTE communications system.

The technology may be used in any type of cellular radio communications. For ease of description, the term user equipment (UE) encompasses any kind of radio communications terminal/device like mobile station (MS), PDAs, cell phones, laptops, etc. Although the technology described in this application may be used in any cellular radio communications system, for illustration purposes only, a non-limiting example is described in the context of an LTE system 10 such as that shown in FIG. 2. The LTE architecture includes logical interfaces between eNBs 18 (interface X2) and between each eNB and core network Mobility Management Entity (MME)/Serving Gateway (S-GW) node 12, 14 (interface S1). The radio access portion of the network is referred to as an enhanced-UMTS Terrestrial Radio Access Network (E-UTRAN) 16, where UMTS stands for Universal Mobile Telecommunications System. In LTE, the downlink is based on orthogonal frequency is division multiplexing (OFDM), and the uplink is based on a single carrier modulation method known as discrete Fourier transform spread OFDM (DFT-S-OFDM). Most decisions related to the radio access network are distributed to the eNB. One example is handover, where the mobile terminal moves from a source eNB to a target eNB. The procedure is supported by signaling between the eNBs over X2 (or S1).

Figure 3:
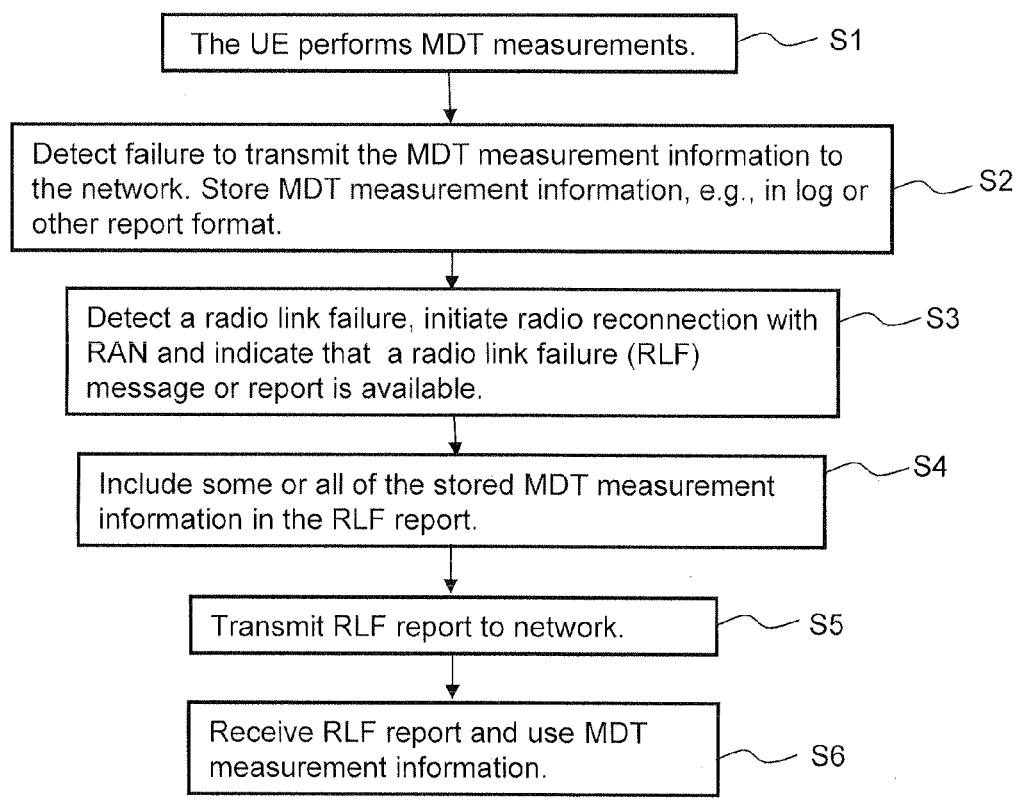
FIG. 3 is a flowchart diagram illustrating non-limiting example procedures for UE-based MDT measuring and reporting in a cellular radio access network when radio communication is temporarily disrupted between a UE and the RAN and re-connected by a radio connection reestablishment procedure.

As described in the background, UEs are configured to perform and report MDT measurements. FIG. 3 is a flowchart diagram illustrating non-limiting example procedures for UE-based MDT measuring and reporting in a cellular radio access network. In step S1, the UE performs MDT measurements for reporting to the network at a time that depends on mode of the UE (connected or idle) or selected report mode (immediate, logged or other) (step S2).

Non-limiting examples of logged MDT measurements include one or more of received signal strength or power (e.g., RSSI, RSRP, Rxlev, etc.) and received signal quality (e.g., signal or carrier to interference or noise ratio, RSRQ, etc.). A UE may collect logged MDT measurements as long as it is within a configured measurement area like a particular cell that it is camping on from a list of global cell identities, a list of tracking areas (TAs), location areas (LAs), or registration areas (RAs), etc. If no area scope is configured, UE can log measurements throughout a Public Land Mobile Network (PLMN). Measurement reporting for Logged MDT may be triggered by on-demand mechanism where the UE is asked by the network to send the collected measurement logs via RRC signaling. A logged measurement report might include measurement results for a serving cell (the measurement object and the measurement quantity), a time stamp, and location information regarding where the measurement was taken. UE measurements for intra-frequency/inter-frequency/inter-RAT can also be reported. The time stamp can be a relative time stamp counted in seconds from the moment the MDT configuration is received at the UE relative to an absolute time stamp received within the configuration. The absolute time stamp is the current network time at the point when Logged MDT is configured to the UE. The time interval for measurement collection and reporting is preferably separately configurable in order to limit the impact on the UE battery consumption and network signaling load. Location information can be based on available location information in the UE so that the Logged MDT measurements may be tagged by the UE with location data when the measurement is taken. Non-limiting examples of location data include an E-UTRAN Cell Global Identifier (ECGI) of the serving cell when the measurement was taken and Global navigation satellite systems (GNSS) location information (latitude, longitude, and/or altitude), or RF fingerprint information for multiple intra-frequency neighbor cells.

Non-limiting examples of UE measurements for Immediate MDT measurements may be similar to those described above for Logged MDT or they may be different, e.g. a Power Headroom (PH) measurement by UE, an Uplink signal strength/SINR measurement by an eNB, etc. Non-limiting example reporting triggers is Immediate MDT reporting include periodic or threshold-based, e.g., a serving cell becomes worse than threshold.

In step S2, the UE detects a failure to transmit the MDT measurement information to the network as planned (either immediate or at the logged reporting time). The UE stores MDT measurement information that was not reported as planned in memory in some appropriate format. For example, this failure may be attributed to a radio link failure (RLF). The UE detects a failure in a radio link it has with the network and initiates a radio reconnection with the RAN indicating that the radio link failed (step S3). For a non-limiting 3GPP-based example, the UE may initiate an RRC Connection Reestablishment procedure and generate an RRC reestablishment request, and as a part of the RRC Connection Reestablishment procedure, the UE may indicate that a Radio Link Failure (RLF) message or report can be provided.

As described in the background, a Radio Link Failure (RLF) can interrupt MDT reporting. RLF may be caused by a coverage hole/area where the signal level of both serving and allowed neighbor cells is below the level needed to maintain basic service. Coverage holes may be caused by physical obstructions such as new buildings, hills, or by unsuitable antenna parameters, or inadequate RF planning. Another cause of RLF is weak coverage which occurs when the signal level of the serving cell is below the level needed to maintain a planned performance requirement (e.g. cell edge bit-rate). A third cause is pilot pollution which may occur in areas where coverage of different cells overlap a lot, interference levels are high, power levels are high, energy consumption is high, and cell performance may be low. Overshoot is another RLF cause that occurs when coverage of a cell reaches far beyond what is planned. Poor UL coverage might impact user experience in terms of call setup failure/call drop/poor UL voice quality.

In the RLF report, the UE also includes some or all of the MDT measurement information that the UE stored because it could not be transmitted to the network as planned (step S4).

The UE transmits that RLF report (step S5) which is then received and used by one or more network nodes for network management (step S6).

Figure 4:
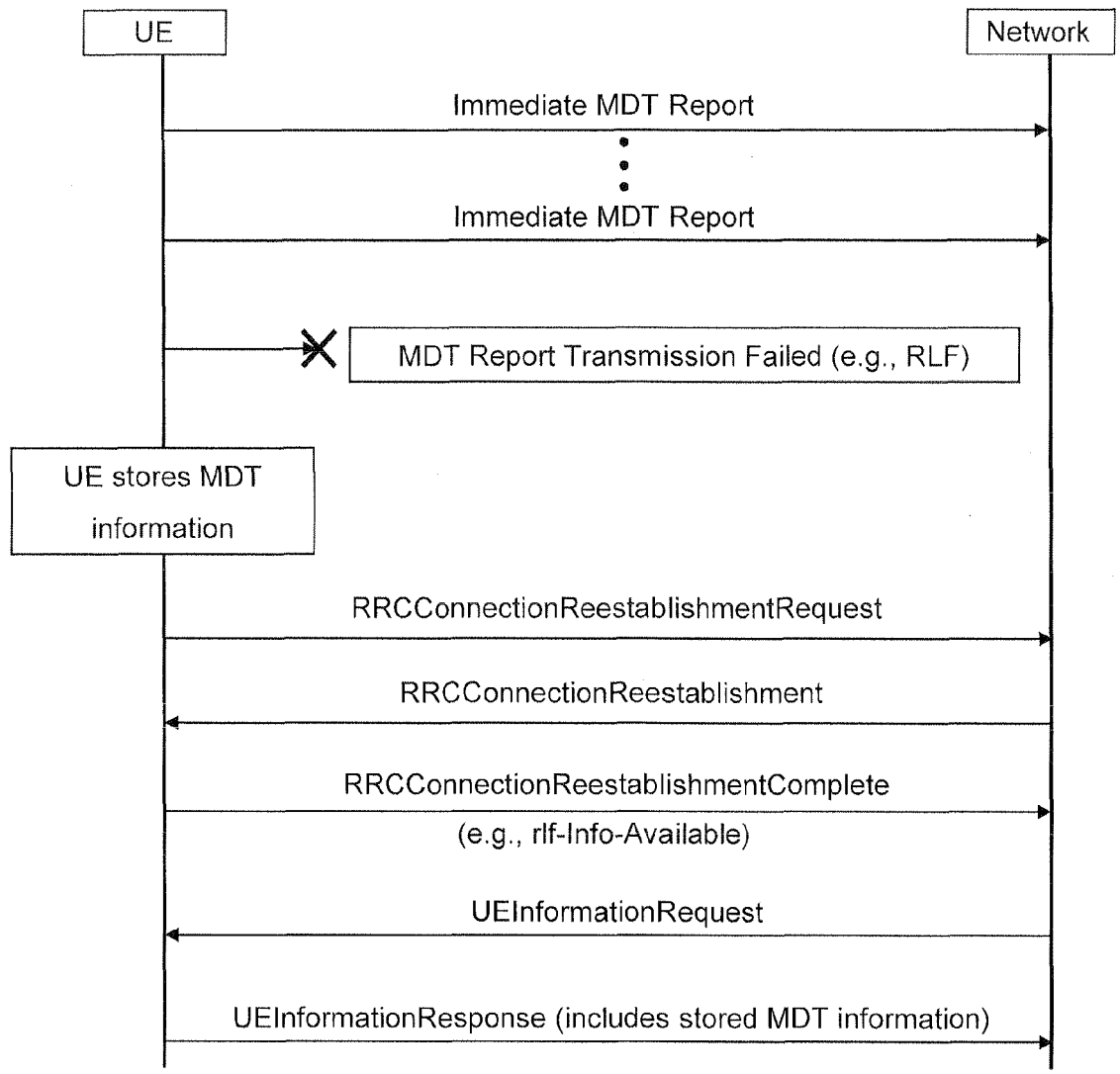
FIG. 4 illustrates a non-limiting example signaling diagram for UE-based MDT measuring and immediate reporting in a cellular radio access network measurements when a radio communication is temporarily disrupted between a UE and the RAN and re-connected by a radio connection reestablishment procedure.

FIG. 4 illustrates a non-limiting example signaling diagram for UE-based MDT measuring and immediate reporting in a cellular radio access network in an LTE network. The UE is shown in connected mode and the network node could be for example an eNB if the network is LTE-based. In this example, the UE sends several immediate MDT reports to the network node until a radio link failure (RLF) occurs, after which, the MDT report transmission does not occur as planned. The UE stores the MDT measurement information and then sometime later sends an RRCConnectionReestablishmentRequest message to the eNB in order to try and re-establish the RRC connection. The eNB responds with an RRCConnectionReestablishment message which the UE confirms with an RRCConnectionReestablishmentComplete message. The UE includes in the RRCConnectionReestablishmentComplete message an rlf-InfoAvailable indicator that informs the eNB that the UE has radio link failure information available related to the last occurrence of radio link failure. In response, the eNB sends an to UEInformationRequest message with an rlf-ReportReq indicator set. The UE detects the set rlf-ReportReq indicator and sets the contents of an rlf-Report in the UEInformationResponse message to also include the stored unreported MDT information. In this way, the network automatically receives valuable MDT measurement information without incurring an increased signaling load in order to request and receive it.

Figure 5:
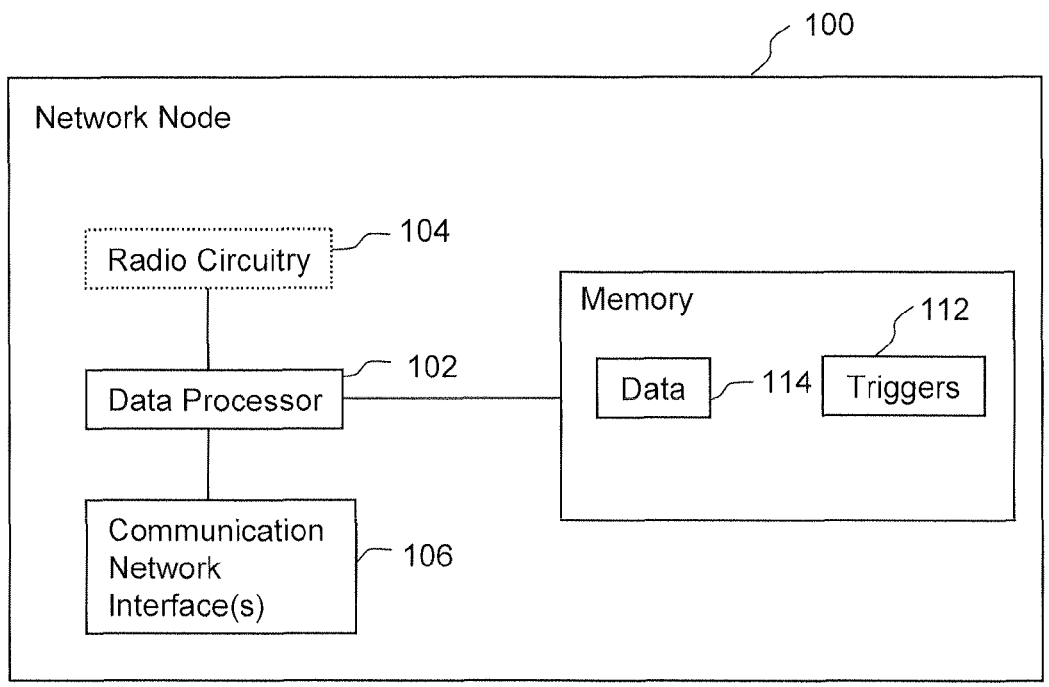
FIG. 5 is a non-limiting example function block diagram of a network node.

FIG. 5 is a function block diagram of a network node 100 that may be used to implement network-related operations described above. A data processor 102 controls overall operation of the network node. The network node 100 may be a radio network node (some sort of base station or access point) and thus include radio communications circuitry 104. Alternatively or additionally, the network node 100 may be a core network or other network node in which case radio circuitry may not be needed unless that node communicates wirelessly. The data processor 102 connects to one or more network communication interface(s) 106 and to memory 108. The memory 108 includes in addition to program instructions: one or more triggers 112 to request reporting of stored MDT information, e.g., due to UE-RBS connection loss MDT, and MDT data 114 sent from one or more UEs.

Figure 6:
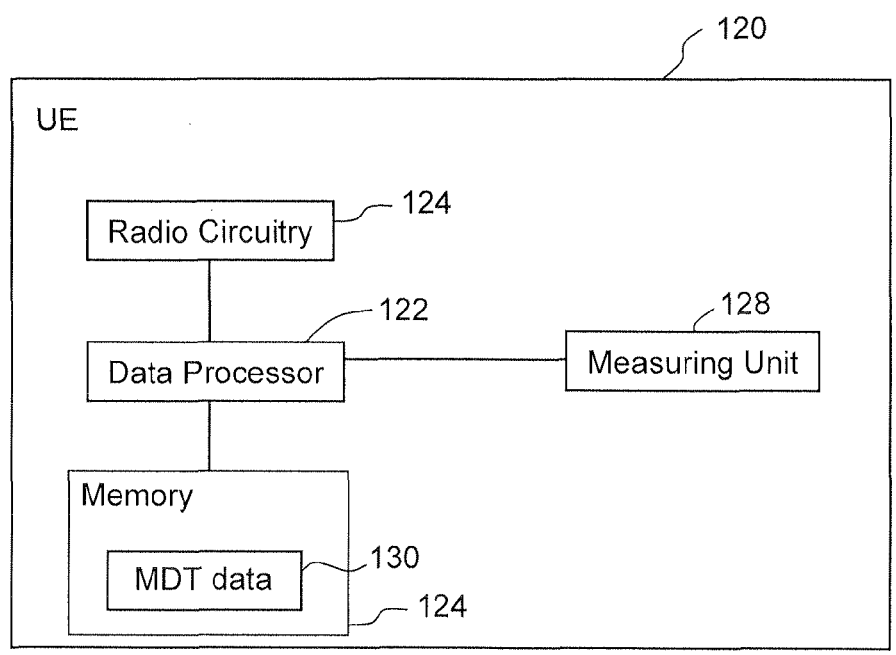
FIG. 6 is a non-limiting example function block diagram of a UE node.

FIG. 6 is a function block diagram of a UE node that may be used to implement UE-related operations described above. The UE 120 includes a data processor 122 that controls the overall operation of the UE and is coupled to radio circuitry 124 for making and receiving radio communications, e.g., with a radio access network. The processor 122 is coupled to memory 126 that stores MDT measurement data acquired by a measuring unit 128 preferably along with time and/or location information. Data processor 122 is also coupled to a measuring unit 128 which is shown as a separate unit from the processor 122 but whose functions may be performed by the data processor 122 if desired. The measuring unit 128 makes MDT measurements and/or reports to the network MDT measurement information in accordance with its mode of operation (immediate or logged reporting).

Figure 7:
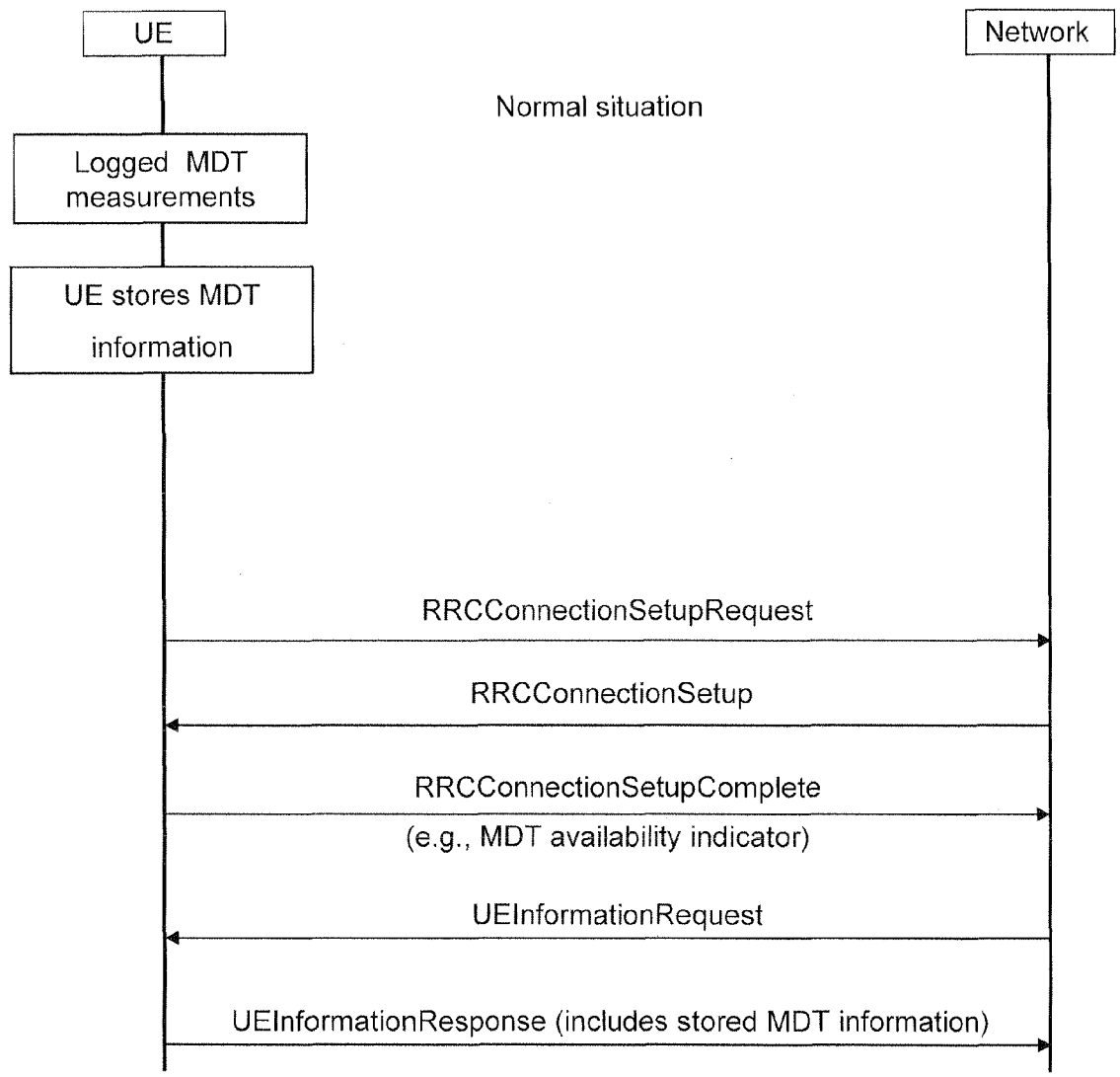
FIG. 7 illustrates a non-limiting example signaling diagram for UE-based MDT measuring and logged reporting in a cellular radio access network.

FIG. 7 illustrates a non-limiting example signaling diagram for UE logged MDT measuring and reporting in an example LTE-type cellular radio access network. In normal operation, the UE performs logged MDT measurements and stores logged MDT measurement information for reporting when the UE enters connected mode. To enter connected mode, the UE sends an RRCConnectionSetupRequest message to the network which results in a signaling handshake that sets up a radio link. In the RRCConnectionSetupComplete response, the UE includes an MDT availability indicator. The network then responds with a UEInformationRequest that triggers the UE to send a UEInformationResponse that includes the logged MDT information.

Figure 8:
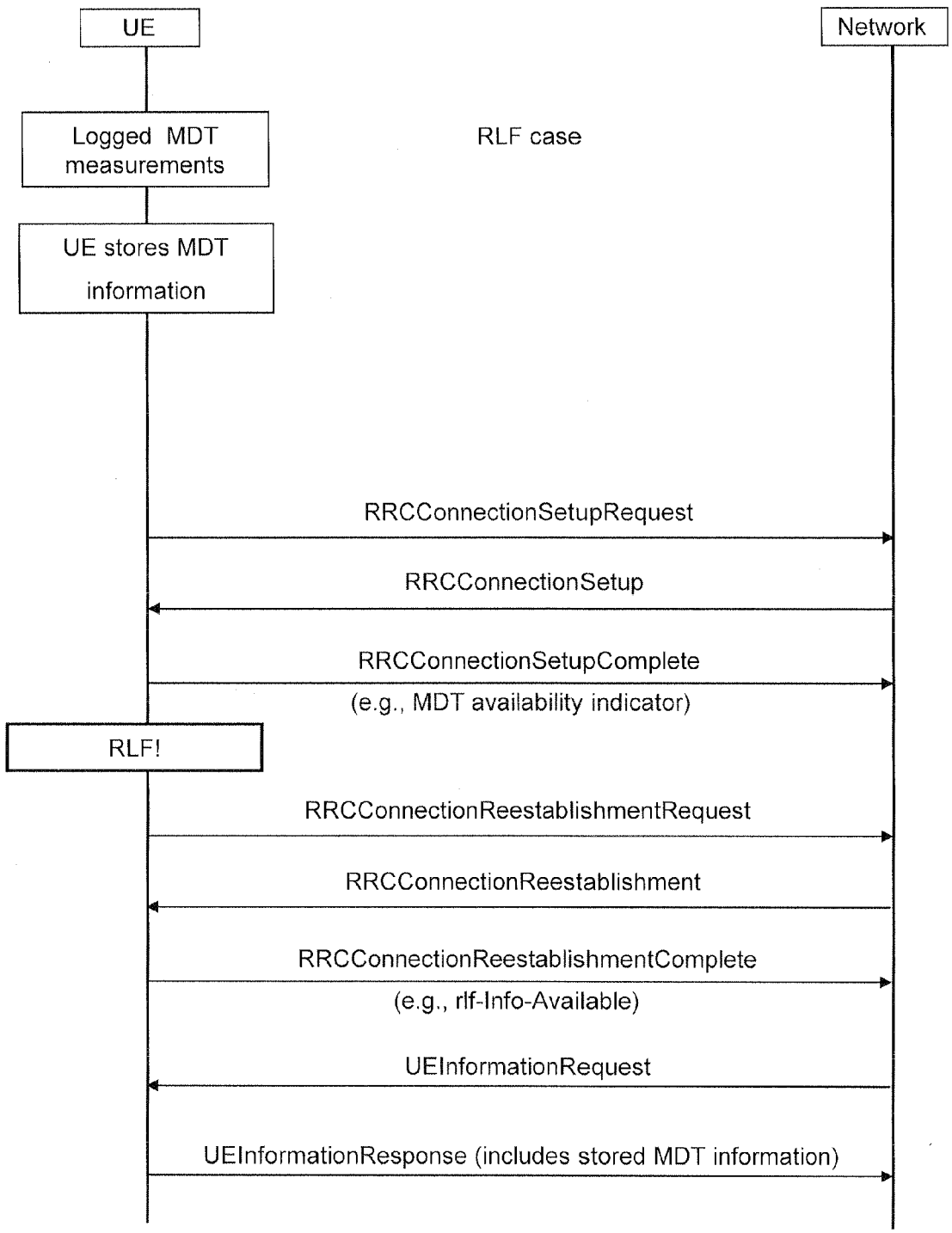
FIG. 8 illustrates a non-limiting example signaling diagram for UE-based MDT measuring and logged reporting in a cellular radio access network when a radio communication established to report the logged MDT information is disrupted and then re-connected by a radio connection reestablishment procedure.

FIG. 8 is similar to FIG. 7 illustrating a non-limiting example signaling diagram for UE logged MDT measuring and reporting in an example LTE-type cellular radio access network. But it differs in that the radio link established after the logged MDT information is stored is temporarily disrupted before the UE could report the logged MDT information as planned. After the radio link failure (RLF) occurs, the UE sends an RRCConnectionReestablishmentRequest message to the network in order to try and re-establish the RRC connection. The network responds with an RRCConnectionReestablishment message which the UE confirms with an RRCConnectionReestablishmentComplete message. The UE includes in the RRCConnectionReestablishmentComplete message an rlf-InfoAvailable indicator that informs the eNB that the UE has radio link failure information available related to the last occurrence of radio link failure. In response, the network sends an UEInformationRequest message with an rlf-ReportReq indicator set. The UE detects the set rlf-ReportReq indicator and includes in the contents of an rlf-Report in the UEInformationResponse message the unreported logged MDT information.

Another non-limiting example embodiment relates to MDT reporting in a potential handover situation. In an LTE example context, the UE can only perform RRC reestablishment in either the cell it was previously connected to or in a cell that was prepared for the UE to be handed over to it. But the situation may occur where, while immediate reporting is ongoing by the UE, an attempted handover of the active UE connection to a new cell fails. The disconnected UE then selects a new cell to establish a radio connection with, but this new cell was not prepared for the UE at to handover. As a result, a connection reestablishment procedure may not be used in this situation. Instead, the UE initiates a typical RRC Connection Setup procedure. However, in the RRC Connection Setup procedure, the UE sets the availability indicator in the RRCConnectionSetupComplete message to inform the network that it has stored unreported MDT measurements. The network sends a UEInformationRequest, and the UE responds with the unreported MDT information.

Thus, in this example embodiment, the UE performs MDT measurements for report to the radio communications network as before and detects that no allowed reporting channel to report MDT measurement information exist. The UE stores unreported MDT measurement information. Thereafter, the UE detects an allowed reporting channel to report MDT measurement information and initiates establishment of a radio link with the radio communications network during which it informs the radio communications network using an availability indicator that the UE has stored unreported MDT measurement information to be reported to the radio communications network. The availability indicator may for example be a part of the RRC Connection Setup Complete message as described above. The stored MDT measurement information may be of the Immediate Report type or of the Logged Report type. Examples of reasons for no available reporting channel were described above.

As explained above, the technology described provides more robust reporting because MDT information survives a temporary connection loss between a UE and the RAN.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for a user equipment (UE) to report measurement information to a radio communications network, the UE performing the steps comprising:
   performing minimizing drive test (MDT) measurements for report to the radio communications network;
   detecting a failure to report MDT measurement information;
   in response to detecting the failure to report the MDT measurement information, storing unreported MDT measurement information;
   detecting a radio link failure;
   transmitting a connection reestablishment request message to the radio communications network;
   receiving a connection reestablishment message from the radio communications network responding to the transmitted connection reestablishment request message;
   in response to the connection reestablishment message, transmitting a connection reestablishment confirmation message to the radio communications network, wherein the connection reestablishment confirmation message includes an indication that stored unreported MDT measurement information is available for transmission;
   receiving an information request message from the radio communications network, wherein the information request message includes a report request indicator;
   detecting whether the report request indicator in the received information request message is set; and
   in response to detecting that the report request indicator is set, transmitting a radio link failure (RLF) message that also includes at least some of the stored unreported MDT measurement information to the radio communications network.

2. The method in claim 1, wherein the RLF message includes RLF information different from the stored unreported MDT measurement information.

3. The method in claim 1, wherein the radio communications network is an LTE-based network.

4. The method in claim 3, wherein the MDT measurement information is MDT information measured when the UE was in an immediate MDT reporting mode.

5. The method in claim 3, wherein the MDT measurement information is MDT information measured when the UE was in a logged MDT reporting mode.

6. A method for a network node in a radio communications network, comprising:
   receiving one or more minimizing drive test (MDT) measurement reports from the UE over a radio link;
   receiving a connection reestablishment request message from the UE network after the UE experiences a radio link failure;
   in response to the connection reestablishment request message, transmitting a connection reestablishment message to the UE;
   receiving a connection reestablishment confirmation message from the UE responding to the connection reestablishment request message, wherein the connection reestablishment confirmation message includes an indication that stored unreported MDT measurement information is available for transmission;
   in response to the indication that stored unreported MDT measurement information is available, setting a report request indicator in an information request message and transmitting the information request message to the UE;
   receiving a radio link failure (RLF) message from the UE responding to the information request message, wherein the RLF message includes unreported MDT measurement information; and
   processing the MDT measurement information.

7. The method in claim 6, wherein the RLF message includes RLF information different from the MDT measurement information.

8. The method in claim 6, wherein the MDT measurement information is MDT information measured when the UE was in an immediate MDT reporting mode.

9. The method in claim 6, wherein the MDT measurement information is MDT information measured when the UE was in a logged MDT reporting mode.

10. Apparatus for a user equipment (UE) to report measurement information to a radio communications network, the apparatus comprising:
   radio circuitry configured to establish a radio link with the radio communications network;
   a memory;
   electronic circuitry, coupled to the memory and to the radio circuitry, configured to:
   perform minimizing drive test (MDT) measurements for report to the radio communications network;
   detect a failure to report MDT measurement information;
   in response to detecting the failure to report the MDT measurement information, store unreported MDT measurement information in the memory;
   wherein the electronic circuitry and the radio circuitry are configured to:
   generate and transmit a connection reestablishment request message to the radio communications network;
   receive a connection reestablishment message from the radio communications network responding to the transmitted connection reestablishment request message;
   in response to the connection reestablishment message, generate and transmit a connection reestablishment confirmation message to the radio communications network,
   wherein the connection reestablishment confirmation message includes an indication that stored unreported MDT measurement information is available for transmission;
   receive an information request message from the radio communications network, wherein the information request message includes a report request indicator;
   detect whether the report request indicator in the received information request message is set;
   in response to detecting that the report request indicator is set, to transmit a radio link failure (RLF) report that includes at least some of the stored MDT measurement information to the radio communications network.

11. The apparatus in claim 10, wherein the RLF report includes RLF information different from the stored MDT measurement information.

12. The apparatus in claim 10, wherein the radio communications network is an LTE-based network.

13. The apparatus in claim 12, wherein the MDT measurement information is MDT information measured when the UE was in an immediate MDT reporting mode.

14. The apparatus in claim 12, wherein the MDT measurement information is MDT information measured when the UE was in a logged MDT reporting mode.

15. The apparatus in claim 14, wherein the MDT measurement information is MDT information measured when the UE was in an immediate MDT reporting mode.

16. Apparatus for a network node in a radio communications network, comprising:
   radio circuitry;
   processing circuitry coupled to the radio circuitry and configured to:
   process one or more minimizing drive test (MDT) measurement reports received from a user equipment (UE);
   receive a connection reestablishment request message from the UE network after the UE experiences a radio link failure;
   in response to the connection reestablishment request message, transmit a connection reestablishment message to the UE;
   receive a connection reestablishment confirmation message from the UE responding to the connection reestablishment request message, wherein the connection reestablishment confirmation message includes an indication that stored unreported MDT measurement information is available for transmission;
   in response to the indication that stored unreported MDT measurement information is available, set a report request indicator in an information request message and transmit the information request message to the UE;
   after a radio link failure, process a radio link failure (RLF) message received from the UE responding to the information request message, wherein the RLF message includes unreported MDT measurement information.

17. The apparatus in claim 16, wherein the RLF message includes RLF information different from the MDT measurement information.

18. Apparatus for a user equipment (UE) to report measurement information to a radio communications network, the apparatus comprising:
   radio circuitry configured to establish a radio link with the radio communications network;
   a memory;
   electronic circuitry, coupled to the memory and to the radio circuitry, configured to:
   perform minimizing drive test (MDT) measurements for report to the radio communications network;
   detect that no allowed reporting channel to report MDT measurement information exists;
   in response to detecting that no allowed reporting channel to report MDT measurement information exists, store unreported MDT measurement information in the memory;
   detect an allowed reporting channel to report MDT measurement information;
   in response to the detected allowed reporting channel, generate and transmit a connection reestablishment request message to the radio communications network;
   receive a connection reestablishment message from the radio communications network responding to the transmitted connection reestablishment request message;
   in response to the connection reestablishment message, generate and transmit a connection reestablishment confirmation message to the radio communications network,
   wherein the connection reestablishment confirmation message includes an indication that stored unreported MDT measurement information is available for transmission;
   receive an information request message from the radio communications network, wherein the information request message includes a report request indicator;
   detect whether the report request indicator in the received information request message is set;
   in response to detecting that the report request indicator is set, to transmit a radio link failure (RLF) report that includes at least some of the stored unreported MDT measurement information to the radio communications network.

19. The apparatus in claim 18, wherein the radio communications system is an LTE-compliant system and wherein the connection reestablishment message is a RRCConnectionSetupComplete message.

* * * * *

UNITED STATES PATENT AND TRADEMARK OFFICE
CERTIFICATE OF CORRECTION

PATENT NO. : 8,577,360 B2
APPLICATION NO. : 12/938930
DATED : November 5, 2013
INVENTOR(S) : Olsson It is certified that error appears in the above-identified patent and that said Letters Patent is hereby corrected as shown below:

In the Specification,

In Column 1, Line 62, delete "controller is (RNC)" and insert -- controller (RNC) --, therefor.

In Column 3, Line 10, delete "is link established" and insert -- link is established --, therefor.

In Column 5, Line 39, delete "is division" and insert -- division --, therefor.

In Column 7, Line 22, delete "an to" and insert -- an --, therefor.

In Column 8, Line 36, delete "UE at to" and insert -- UE at --, therefor.

In the Claims,

In Column 10, Line 31, in Claim 10, delete "Apparatus" and insert -- An Apparatus --, therefor.

In Column 11, Line 16, in Claim 16, delete "Apparatus" and insert -- An Apparatus --, therefor.

In Column 12, Line 1, in Claim 18, delete "Apparatus" and insert -- An Apparatus --, therefor.

In Column 12, Line 43, in Claim 19, delete "a RRCConnection-" and insert -- an RRCConnection- --, therefor.

Signed and Sealed this
Twenty-fifth Day of August, 2015

Michelle K. Lee
*Director of the United States Patent and Trademark Office*